July 17, 1928.

C. Y. THOMSON, SR 1,677,505

TRACTOR CULTIVATOR ATTACHMENT

Filed Jan. 6, 1927

Inventor:
C. Y. Thomson, Sr,
By
Atty.

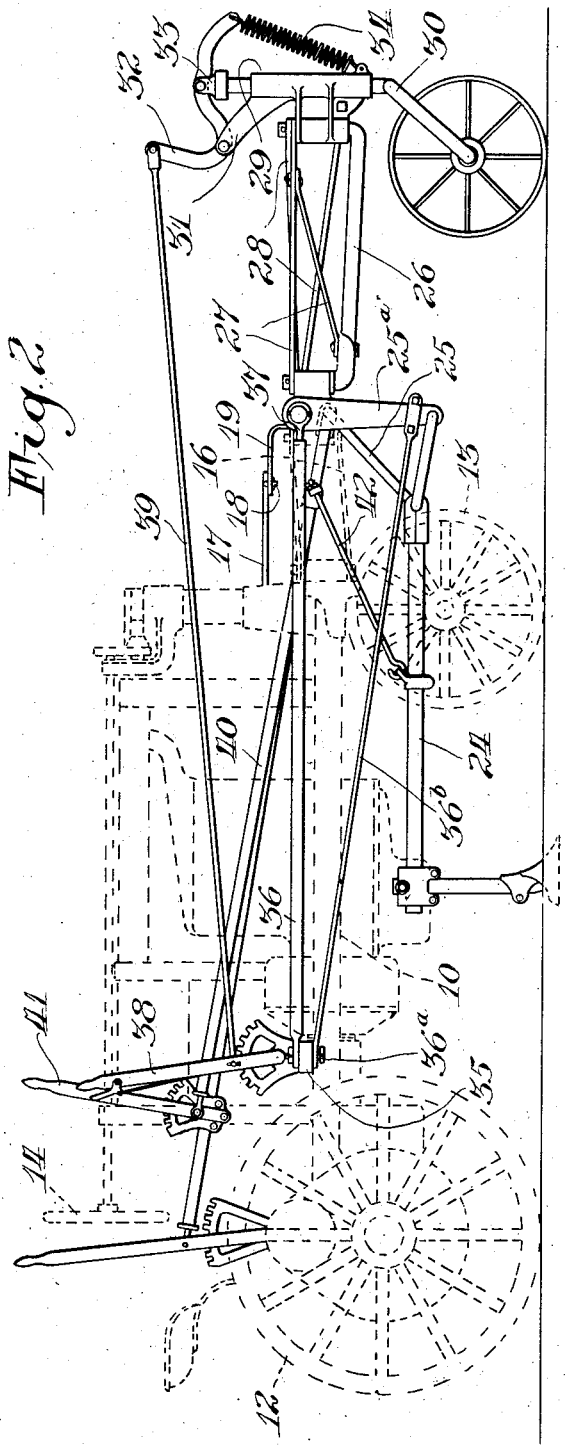

Patented July 17, 1928.

1,677,505

UNITED STATES PATENT OFFICE.

CLARENCE YOUNG THOMSON, SR., OF CHAPMAN RANCH, TEXAS, ASSIGNOR TO INTERNATIONAL HARVESTER COMPANY, A CORPORATION OF NEW JERSEY.

TRACTOR CULTIVATOR ATTACHMENT.

Application filed January 6, 1927. Serial No. 159,268.

This invention relates to tractor cultivators, and more particularly to an auxiliary attachment for existing types of such machines which may be used to convert the machine into a cultivator for working an increased number of plant rows.

More specifically the object of the invention is to provide a simple and practical form of extension attachment for tractor cultivators of the type shown in the patent to Benjamin et al, No. 1,539,108, May 26, 1925, so that the two row tractor cultivator there shown may be converted into a four row machine. This main object of the invention is attained by providing an extension bar for each end of the main implement carrying member, which bar is adapted to be hingedly connected to the end of said member and to be carried on a ground engaging support, such as a caster wheel, so that it may move or float vertically. This bar is provided with an auxiliary pair of cultivator gangs and with means for adjusting the ground engaging support vertically as conditions may require. Preferably the extension bars are braced or held in position by a secondary frame bar extending across the tractor at the rear thereof and which is provided with thrust bars connected to the ends of the extension bars. The invention accordingly resides in the general organization, details of construction and parts, which will hereinafter be more particularly described and defined in the claims.

Referring to the drawings,—

Figure 2 is a similar side view; and

Figure 3 is an enlarged detail view, showing the hinge connection between the main implement member and an extension bar.

Figure 1:
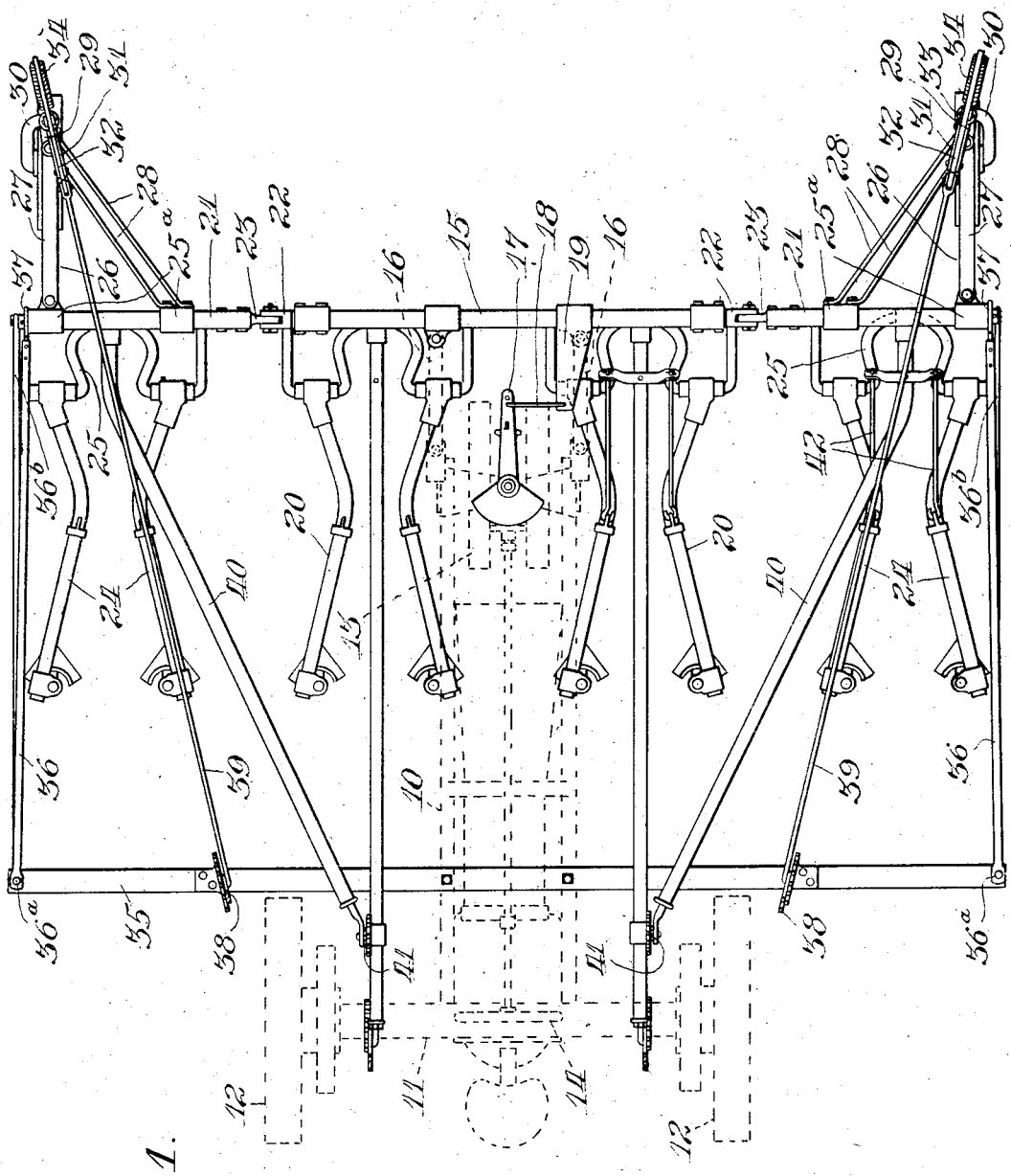
Figure 1 is a plan view of a four row tractor cultivator embodying the attachment comprising the invention, the tractor being shown in broken lines.

In its present embodiment the invention is shown in connection with a tractor comprising a longitudinally extending body 10 and a rear transversely extending axle structure 11 carried on widely spaced traction wheels 12. The wheels 12 are so spaced as to span two plant rows. The front of the tractor body 10 is supported on a steering truck 13 under control of a steering wheel 14 at the rear of the tractor. This tractor carries at its front a transversely extending frame member 15, which is so connected to the tractor, through pivotal supporting arms 16, as to be laterally shiftable with respect thereto through actuation by the steering movement of the truck, there being a connection between the steering truck and the member 15 consisting of an arm 17 fixed on the steering post of the truck and a link 18 connected to a bracket 19 on the member 15. The member 15 extends across the space spanned by the rear traction wheels and each end of said member carries a pair of cultivator beams 20, which are positioned to cultivate rows of plants within said space. The structure so far briefly described is substantially that of the tractor cultivator shown in the Benjamin et al patent aforesaid and forms no part of the present invention except as it combines and cooperates therewith.

In the practice of the present invention an auxiliary extension attachment is provided for each end of the main implement carrying frame member 15, each extension comprising a hollow bar 21 of similar shape and diameter as the main member 15 and having means for hinged connection to the end of member 15 comprising complementary hinge portions 22, 23 having portions extending into the bores of the member 15 and bar 21, both of which are tubular in form. Each bar 21 is, at least, of sufficient length to permit connection thereto of an auxiliary pair of cultivator gangs 24 which may be identical in kind to the beams 20 and supported on the bar 21, through an arched member 25 and depending bearing arms 25ª, in the same manner as are the beams 20. The extension bar 21 has connected to its forward side a forwardly projecting bracket member 26 which may be braced by truss bars 27 and also braced on the extension bar by diagonal bars 28, as shown in Figure 1. The forward end of member 26 carries a bearing bracket 29 in which is journaled a vertical standard or spindle of a freely swiveled caster wheel 30. The bearing bracket 29 is formed with an upstanding extension 31 on which is fulcrumed a lever 32, which extends over the top of the caster wheel standard where it is provided with a bearing cap 33, which bears on the end of the standard of the caster wheel 30. The forward end of lever 32 projects ahead of the bracket 29, and a tension spring 34 connects the end of lever 32 with bracket 29 and assists in lowering the caster wheel, the standard of which is both slidable and rotatable in its support. In connection with the extension attachment, there is preferably employed a secondary transversely extending frame member 35 designed for connection across the rear of the tractor body, as shown in Figure 1.

Each end of this secondary bar serves as a support or abutment for the rear end of a main thrust bar or brace 36 loosely connected on a bolt 36$^a$ or similar element on the bar 35 and pivotally connected at its front end, as at 37, to the end of the extension bar 21 so as not to interfere with the normal vertical movement of the extension bar. A secondary thrust bar or brace 36$^b$, also loosely carried on bolt 36$^a$ at its rear end and connected at its front end to the lower end of the outer depending member 25$^a$, may also be employed to resist the pull of the cultivator gangs on the end of the auxiliary attachment. The secondary bar 35 also serves as the carrying member for an adjusting lever 38 which is connected by means of a link or rod 39 with upstanding end of lever 32, as shown in Figure 2. It will be obvious that swinging of lever 38 will impart vertical movement to the standard of the caster wheel 30 and thereby vary the inclination of the extension bar 21. Each of the extension gangs 24 is provided with a lifting and lowering means which may be similar in character to that with which the inner gangs 20 are equipped, said means comprising an actuating rod 40 connected at its rear end to an adjuting lever 41, which may be mounted on the similar actuating rod for the pair of gangs 20. The forward end of this rod is connected to the arch 25 and also to each of the beams 24 through lifting links 42. Actuation of lever 41 will, therefore, serve to rock the arch member 25 and simultaneously move the links 42 either forwardly or backwardly, thereby transmitting a parallel lift to the beams 24 in substantially the same manner as described in the patent aforesaid in connection with the lifting mechanism for the beams 20.

It will be understood that the extension attachments for each side of the tractor are identical and that the description of one extension attachment above given applies to both. It will, therefore, be evident that a simple and convenient means for converting a two row tractor cultivator of standard type into a four row machine has been provided and that such attachment can be made readily without altering the construction of the standard machine, thereby permitting such a tractor cultivator to be employed either as a two row or four row machine. Other advantages of the construction will be obvious to those skilled in the art.

While the above disclosure exemplifies the preferred embodiment of the invention, it will be evident that it is capable of considerable modification without departure from the scope of the invention as defined in the following claims.

What is claimed is:

1. The combination with a tractor cultivator having a rigid frame member extending laterally therefrom to a point beyond the tractor wheel tread, of an extension for said member comprising a bar hinged to the end of said member for vertical movement, a caster wheel supporting said bar, and cultivating tools having beams connected to the bar.

2. The combination with a tractor cultivator having a rigid frame member extending laterally therefrom to a point beyond the tractor wheel tread, of an extension for said member comprising a bar hinged to the end of said member for vertical movement, a forwardly extending supporting bracket on said bar, a caster wheel swiveled on said supporting bracket, and cultivating tools having beams connected to the bar and trailing rearwardly therefrom.

3. The combination with a tractor cultivator having a rigid frame member extending laterally therefrom at the front of the tractor, of an extension for said member comprising a bar hinged to the end of said member for vertical movement, cultivating tools carried by said bar, a second frame member extending laterally from the rear of the tractor, a vertically adjustable caster wheel supporting said extension bar, and means for adjusting the caster wheel to vary the inclination of the extension bar, said means including an actuating element mounted on said second laterally extending frame member.

4. An auxiliary gang attachment for tractor cultivators having widely spaced rear traction wheels, a rigid frame member extending across the front of the tractor and spanning the space between said wheels and cultivating tools carried by each end of said member within said space; said auxiliary attachments comprising extensions for the ends of said member each extension comprising a bar adapted to be hinged to the end of the member for vertical movement, a caster wheel supporting the bar, a pair of vertically shiftable cultivator beams connected to the bar and trailing therefrom, and means for raising and lowering the beams including an actuating rod extending rearwardly and having means for connection to the tractor.

5. An auxiliary gang attachment for tractor cultivators having widely spaced rear traction wheels, a rigid frame member extending across the front of the tractor and spanning the space between said wheels and cultivating tools carried by each end of said member within said space; said auxiliary attachments comprising extensions for the ends of said member each extension comprising a bar adapted to be hinged to the end of the member for vertical movement, a supporting bracket projecting from the forward side of said bar, a caster wheel swiveled in a bearing on said supporting bracket, cultivator beams connected to and trailing at the rear of said bar, a secondary frame bar adapted to be connected across the tractor on the rear thereof, and a thrust bar loosely connecting the end of the extension bar with said secondary frame member.

6. An auxiliary gang attachment for tractor cultivators having widely spaced rear traction wheels, a rigid frame member extending across the front of the tractor and spanning the space between said wheels and cultivating tools carried by each end of said member within said space; said auxiliary attachments comprising extensions for the ends of said member each extension comprising a bar adapted to be hinged to the end of the member for vertical movement, a vertically shiftable ground engaging support carried by the bar, means adapted for actuation from a point on the tractor for adjusting the support, and cultivating means trailing from the bar.

7. An auxiliary gang attachment for tractor cultivators having widely spaced rear traction wheels, a rigid frame member extending across the front of the tractor and spanning the space between said wheels and cultivating tools carried by each end of said member within said space; said auxiliary attachments comprising extensions for the ends of said member each extension comprising a bar adapted to be hinged to the end of the member for vertical movement, a ground engaging support carried by the bar, and cultivating means trailing from the bar.

In testimony whereof I affix my signature.

CLARENCE YOUNG THOMSON, Sr.